UNITED STATES PATENT OFFICE.

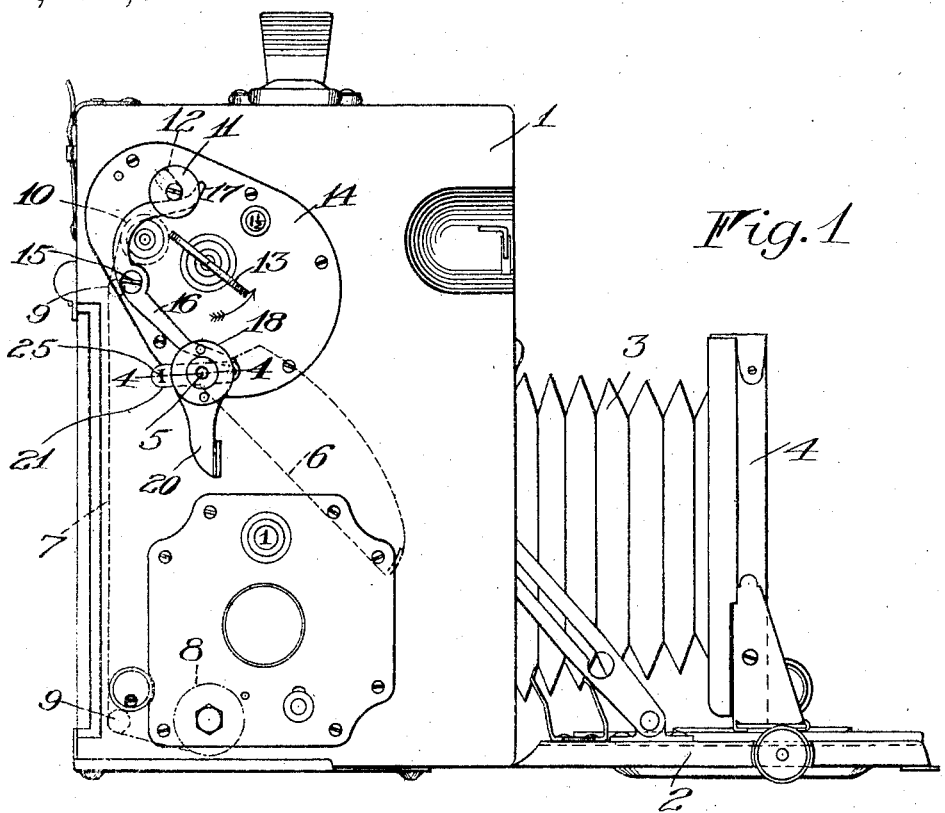

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-SHUTTER MECHANISM.

1,178,709.   Specification of Letters Patent.   Patented Apr. 11, 1916.

Application filed October 15, 1915. Serial No. 56,023.

*To all whom it may concern:*

Be it known that I, WILLIAM F. FOLMER, of Rochester, in the county of Monroe and State of New York, have invented certain new and useful Improvements in Photographic-Shutter Mechanisms; and I do hereby declare the following to be a full, clear, and exact description of the same, reference being had to the accompanying drawings, forming a part of this specification, and to the reference-numerals marked thereon.

My present invention relates to photography and more particularly to photographic cameras of the reflecting type in which the view is focused through the camera lens and cast upon a screen by a mirror movable into and out of an operative position where it intercepts the cone of light and the invention has for its object to provide an improved means for making adjustments whereby the shutter will be tripped automatically with the movement of the mirror to inoperative position or not, accordingly as an instantaneous or a time exposure is to be made. The improvements are directed in part toward increasing the ease and certainty with which the adjustments can be made.

To these and other ends the invention resides in certain improvements and combinations of parts all as will be hereinafter more fully described, the novel features being pointed out in the claims at the end of the specification.

In the drawings: Figure 1 is a side elevation of a camera provided with a shutter mechanism constructed in accordance with and illustrating one embodiment of my invention; Fig. 2 is a similar fragmentary view showing the shutter controlling parts in another position; Fig. 3 is a similar view showing the parts in still another position, and Fig. 4 is a detailed section taken substantially on the line 4—4 of Fig. 1.

Similar reference numerals in the several figures indicate the same parts.

The general construction of the reflecting type of camera involved herein is so well known that it does not require description as to all its parts.

The box or body is indicated at 1, the bed at 2, the bellows at 3 and the front at 4. A shaft 5 passes transversely through the body and fixed thereto inside of the camera is a swinging mirror, indicated by dotted lines at 6. The position in which the mirror is shown is its operative position for reflecting the image cast by the lens upwardly onto a focusing screen at the top of the body. In rear of the mirror and shaft is the focal plane or curtain shutter with which these cameras are usually fitted, which shutter is also indicated in dotted lines at 7. It runs from a spring actuated tension roller 8 over guide rolls 9 to a winding roller 10. When the curtain is wound up thereon, the roller is detained by suitable mechanism that may be released by an exteriorly arranged sliding button 11 to allow the tension roller 8 to reel the curtain back and make the exposure. The normal position of the releasing button 11 is that shown in Fig. 1 and it is moved upwardly to the left in the direction defined by the slot 12 to the position shown in Fig. 2 to release the shutter. The shutter winding key is shown at 13. It is desirable in these cameras that the shutter be actuated or released and the mirror 6 rotated upwardly under the influence of its spring (not shown) to its horizontal inoperative position with substantially one operation. In other words, provision is made for releasing the shutter automatically as soon as the mirror is swung out of the way. My improved mechanism for bringing about this result is as follows: Pivoted to the mounting plate 14 at 15 is a lever 16, an arm 17 of which lies beneath the button 11. On the shaft 5 of the mirror 6 are fixed two disks 18 and 19 (Fig. 4), one of which preferably has an extension 20 constituting an arm or lever by means of which the operator resets the mirror 6 in operative position against the tension of its spring. The inner faces of the disks are recessed to receive a plate 21 slotted at 22 to straddle the shaft 5 and capable of sliding back and forth diametrically of the disks, so that one end or the other is caused to project. At one end the plate is provided with a pin or projection 23, and when this end is thrust out, the said projection clears the lever 16 as the shaft 5 turns and swings the mirror to inoperative position. This end of the plate has applied thereto a character 24 indicative of a time exposure. When the other end of the plate protrudes, as shown in Fig. 1, the pin 23 is retracted to a position in which it will engage the lever 16 upon rotation of the shaft, and this end bears a character 25, indicative of an instantaneous exposure. Thus when an instantaneous exposure is desired the plate is set as in Fig. 1, the "time" character 24 being obscured by the disk 18 and the "instantaneous" character 25 revealed. The release of the mirror will then cause the pin 23 to engage the lever 16, causing the arm 17 thereof to rock upwardly and move the button 11, tripping the shutter. For a time exposure, it is desired that the mirror 6 be released without releasing the shutter, which is subsequently operated by hand through the medium of the button 11. The plate 21 is therefore thrust to the right in Fig. 1, obscuring character 25 and revealing character 24. In this position the pin 23 will clear the lever 16 as the mirror shaft rotates, as shown in dotted lines in Fig. 3, and the movement of the mirror will have no effect upon the shutter mechanism.

A certain degree of frictional resistance against the sliding movement of the plate 21 is provided to prevent it from changing its position, and this may be done by springing it slightly. It will be seen, however, that the pressure borne by it in engaging the lever 16 is not such as to tend to reverse its position. (See Fig. 2).

I claim as my invention:

1. In a photographic camera, the combination with a swinging focusing mirror, a shutter, and a shutter releasing device, of a rotary element movable with the mirror and a sliding member mounted thereon and provided with an actuating projection movable into and out of the path of the releasing device to trip the shutter through the movement of the mirror.

2. In a photographic camera, the combination with a swinging focusing mirror, a shutter and a shutter releasing device, of a rotary element movable with the mirror and an adjustable member mounted thereon and provided with an actuating projection movable into and out of the path of the releasing device to trip the shutter through the movement of the mirror, said adjustable member being provided with characters signifying "time" and "instantaneous" exposures, respectively, one of which is obscured and the other exposed by the adjustments of the member.

3. In a photographic camera, the combination with a swinging focusing mirror, a shutter and a shutter releasing device, of a rotary element movable with the mirror and an adjustable member mounted thereon to slide diametrically thereof and project at opposite sides, said member being provided with an actuating projection movable into and out of the path of the releasing device to trip the shutter through the movement of the mirror.

4. In a photographic camera, the combination with a swinging focusing mirror, a shaft therefor, a shutter and a shutter releasing device, of a pair of disks fixed to the shaft, and a slotted plate mounted between the latter to slide diametrically thereof and project at opposite sides, said plate being provided with an actuating projection movable into and out of the path of the releasing device to trip the shutter through the movement of the mirror and with characters signifying "time" and "instantaneous" exposures, respectively, one of which characters is obscured by one of the disks and the other exposed by the adjustments of the plate.

WILLIAM F. FOLMER.

Witnesses:
   RUSSELL B. GRIFFITH,
   HARRIET T. VAY.